United States Patent [19]

Marc Conraux et al.

[11] 3,911,329

[45] Oct. 7, 1975

[54] DEVICE FOR CUMULATING THE USEFUL SECTIONS OF A SIGNAL APPEARING IN THE FORM OF A SERIES OF PULSES EACH HAVING A USEFUL SECTION

[75] Inventors: Claude Charles Marc Conraux, Strasbourg; Alain Despringre, St-Ismier; Gerard Kaphan, Marseille; Jacques Max, St-Egreve, all of France

[73] Assignee: Commissariat a l'Energie Atomique, Paris, France

[22] Filed: May 28, 1974

[21] Appl. No.: 474,103

[30] Foreign Application Priority Data

June 6, 1973 France .................... 73.20611

[52] U.S. Cl. .................. 328/14; 128/2.1 R; 328/127
[51] Int. Cl.² .... A61B 5/10; G06G 7/18; H03K 5/00
[58] Field of Search ............ 328/14, 127; 324/77 R; 128/2.1 R

[56] References Cited

UNITED STATES PATENTS 3,535,645  10/1970  Kinbara ............................. 328/127
3,714,581  1/1973  Sage ................................ 328/127 X Primary Examiner—Siegfried H. Grimm
Attorney, Agent, or Firm—Cameron, Kerkam, Sutton, Stowell & Stowell

[57] ABSTRACT

A voltage which is proportional to the mean slope of the slow phase of the $n^{th}$ pulse of the signal is produced and then integrated during the time interval of the fast return of the $n^{th}$ pulse so as to produce the signal $I_n$. The low-gradient section of the $n^{th}$ pulse is added to the cumulated signal corresponding to the $n - 1$ first pulses so as to produce a signal $P_n$ and the signals $P_n$ and $I_n$ are added so as to produce the cumulated signal Sn corresponding to the $n$ first pulses.

3 Claims, 4 Drawing Figures

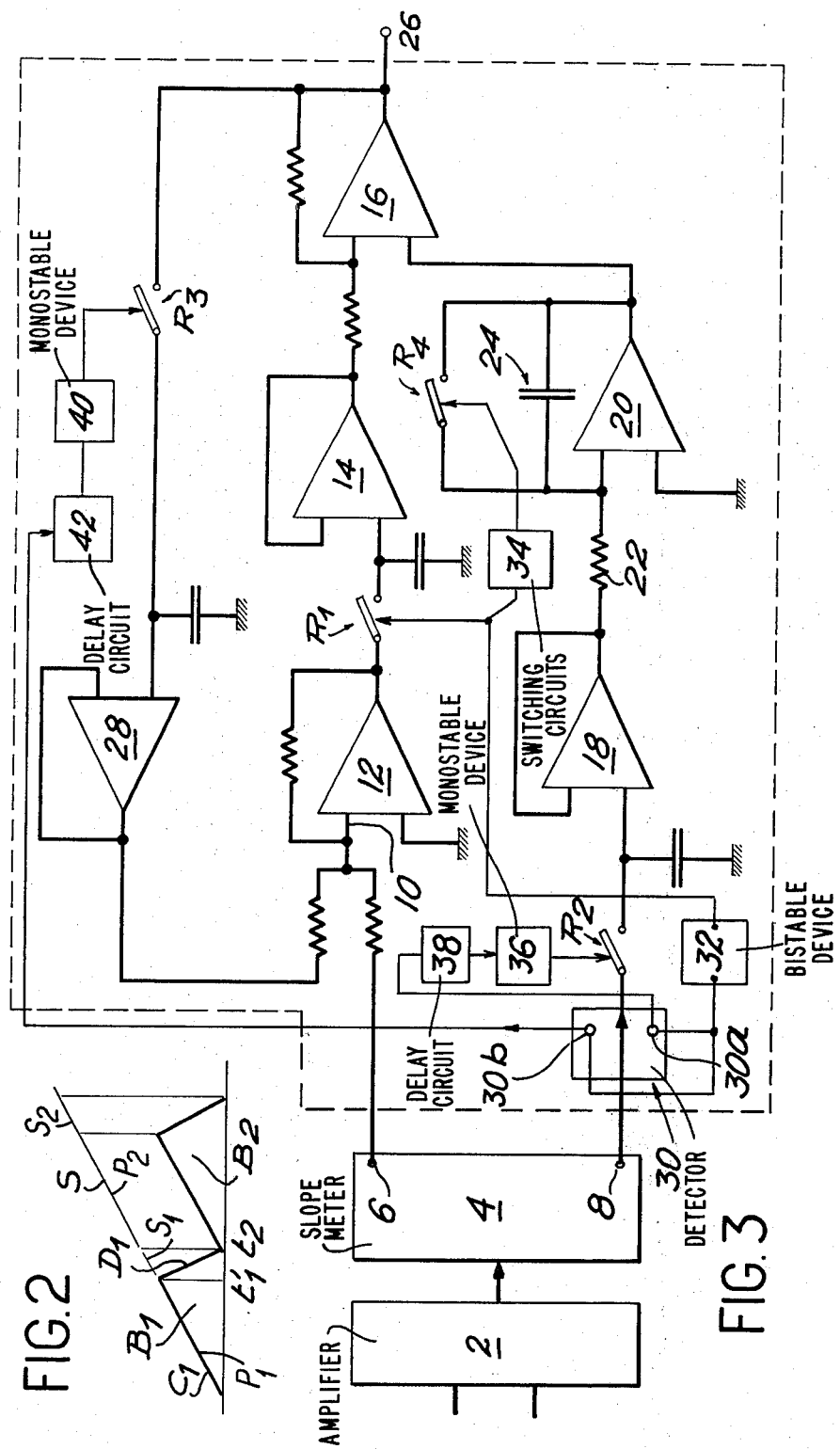

DEVICE FOR CUMULATING THE USEFUL SECTIONS OF A SIGNAL APPEARING IN THE FORM OF A SERIES OF PULSES EACH HAVING A USEFUL SECTION

This invention relates to a device for cumulating the useful sections of a signal produced in the form of a series of pulses each having a useful section defined by its slope.

This invention is preferably directed to an analog device for forming the cumulated sum either of slow-variation sections or of fast-variation sections of a signal constituted by a series of pulses in which each pulse has a slow phase and a fast return.

The present invention will be more readily understood by referring to the accompanying drawings, in which:

FIG. 2 represents a curve which illustrates the method of extrapolation of the slow phases;

FIG. 3 is a general arrangement diagram of the device in accordance with the invention;

Figure 1:
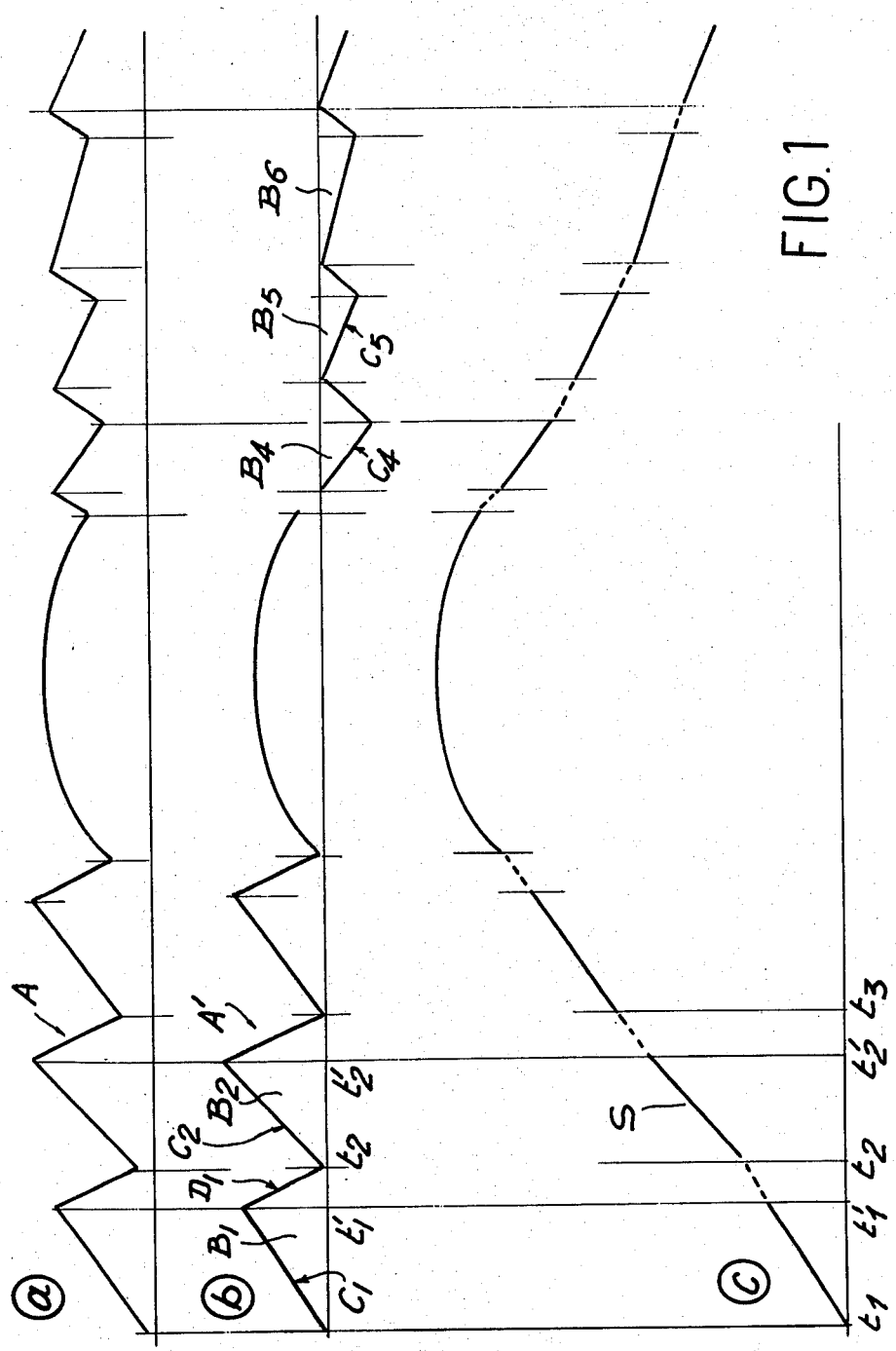
FIG. 1 is a representation of the curves illustrating the cumulation of the slow phases of a signal.

There is represented in FIG. 1a a signal A consisting of a series of pulses each having a substantially constant low-gradient phase (slow phase) and a fast return phase. In a first period, re-centering of the pulses is carried out in order to ensure that the starting point of each slow phase is at the level 0. This is shown in FIG. 1b. Each pulse $B_1, B_2 \ldots B_6$ comprises a slow phase $C_1, C_2 \ldots C_6$ and a fast-return phase $D_1, D_2 \ldots D_6$. There is shown in FIG. 1c the cumulated signal S corresponding to the signal A'. Between the instants $t_1$ and $t'_1$ corresponding to the slow phase of the first pulse $B_1$, the curve S is identical with the curve A'. The curve $C_1$ is extrapolated between the instants $t'_1$ and $t_2$ corresponding to the first fast return $D_1$. There is therefore the same mean gradient or slope as between $t_1$ and $t'_1$. Between the instants $t_2$ and $t'_2$ corresponding to the slow phase $C_2$ of the second pulse $B_2$, the curve S has a slope which is equal to the slope of the slow phase $C_2$ of the pulse $B_2$. Between the instants $t'_2$ and $t_3$ (extrapolation of $C_2$), the slope of the curve S is the mean slope of the slow phase of the pulse $B_2$ between the instants $t_2$ and $t'_2$ and so forth. It is readily apparent that the slopes of the slow phases can be positive (from $B_1$ to $B_3$) or negative (from $B_4$ to $B_6$).

This problem arises in particular in the case of processing of nystagmographic signals. Nystagmography consists in recording, for example by means of the electrical signals collected by periorbital electrodes, the movements of the eyeball resulting from suitable stimulation of the vestibular system. As a first approximation, the cumulated graph of these signals can be considered as representative of the energy applied by the stimulation on condition that the fast-return phases are not taken into account and that the preceding slow phase is extrapolated during the time interval of each fast return.

The present invention is specifically directed to an electronic device designated as a "cumulometer" which has the intended function of plotting the cumulative graph of displacement of the eyeball by means of electrical signals collected by the periorbital electrodes.

The device for cumulating the low-gradient sections of a signal constituted by a series of pulses each having a slow phase and a fast-return phase, said pulses being first re-centered if necessary in order to make the beginning of each slow phase correspond to the zero level, is characterized in that it comprises:

means for producing a voltage which is proportional to the mean slope of the slow phase of the $n^{th}$ pulse of the signal and for integrating said voltage during the time interval of the fast return of the $n^{th}$ pulse, thus producing the signal $I_n$, means for adding the low-gradient section of the $n^{th}$ pulse to the cumulated signal corresponding to the $n - 1$ first pulses, thus producing a signal $P_n$, and means for adding the signals $P_n$ and $I_n$, thus producing the cumulated signal Sn corresponding to the $n$ first pulses.

A clearer understanding of the invention will in any case be obtained from the following description of one embodiment of the invention which is given by way of example without any limitation being implied.

After re-centering each pulse as mentioned earlier, the slow phases of each jerk must be added in time. In order to obtain a signal which is representative of the displacement of the eyeball, it is essential to extrapolate each slow phase during the time interval of the following rapid jerk.

This is illustrated in FIG. 2 in which the first jerk $B_1$ is retained. During the time interval $t'_1 t_2$ corresponding to the fast return, the portion of curve $B_1$ is extrapolated. If $a$ designates the slope of the slow phase (portion of curve $B_1$), the expression:

$$Q = \int_{t_1'}^{t_2} a\, dt$$

provides a very good extrapolation of the portion of curve $B_1$. It is readily apparent that the slope $a$ is measured in magnitude and in sign. In other words, the extrapolation is obtained by integrating the slope of the preceding low-gradient portion of curve during the time interval of the fast return.

The general arrangement of the cumulation device or "cumulometer" is represented in the diagram of FIG. 3. There is shown in this diagram a drift-corrected D.C. amplifier which amplifies the signal collected by the periorbital electrodes. This amplifier 2 was disclosed in U.S. Pat. No. 3,498,288. The output of said amplifier drives a slope-meter 4. By way of example, said slope-meter is of the type described in U.S. Pat. No. 3,624,497. In this case, the slope-meter 4 delivers at its output 6 the signal which is delivered by the amplifier 2 but recentered (signal A' represented in FIG. 1b) and delivers at its output 8 a voltage which is proportional to the slope of each pulse of the signal A'.

The output 6 of the slope-meter 4 drives the reversing input 10 of the operational amplifier 12 which is mounted as a summation device in known manner. The output of the amplifier 12 is connected to the direct input of the operational amplifier 14 through the switch $R_1$. The operational amplifier 14 is mounted as a storage circuit. The output of the amplifier 14 is connected to the reversing input of the operational amplifier 16 which is mounted as an adder. The output 8 of the slope-meter 4 is connected to the operational amplifier 18 through the switch $R_2$. The operational amplifier 18 is mounted as a storage circuit. The output of the amplifier 18 drives the reversing input of the operational amplifier 20 which is mounted as an integrator with the resistor 22 connected to its input whilst the capacitor 24 and the zero-reset switch $R_4$ are mounted in negative feedback. The output of the amplifier 20 drives the direct input of the amplifier 16. The output 26 of the amplifier 16 constitutes the output terminal of the device. The output of the amplifier 16 is also connected to the direct input of the amplifier 28 through the switch $R_3$. The amplifier 28 is mounted as a storage circuit. The output of the amplifier 28 drives the reversing input 10 of the amplifier 12 which is mounted as a summation device.

Figure 4:
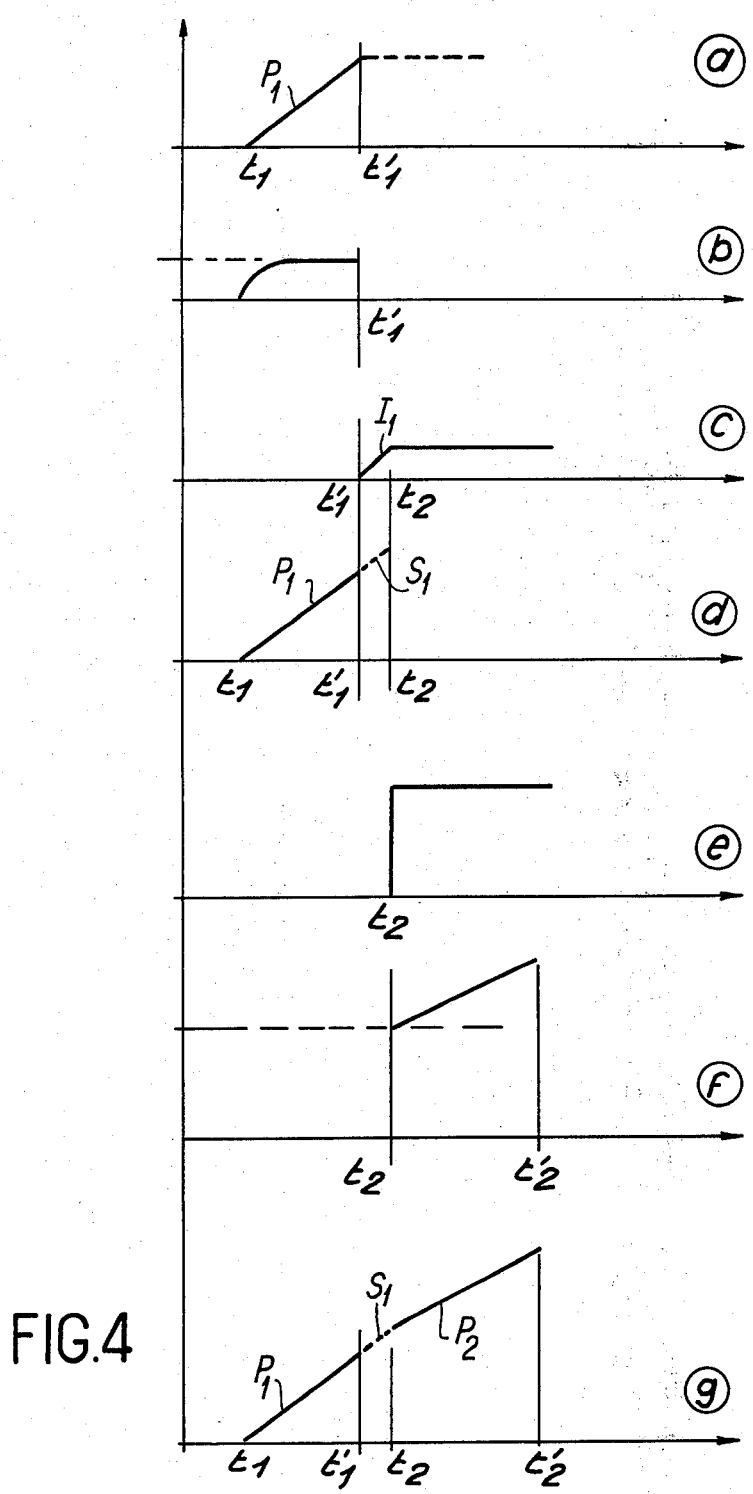
FIG. 4 is a representation of the curves which give the different signals appearing at various points of the device shown in FIG. 3.

Referring now to FIG. 4, the operation of the device will be more readily understood.

The centered nystagmic signal delivered to the terminal 6 of the slope-meter 4 is fed into the operational amplifier 10 until the appearance of the first fast return which initiates opening of the switch $R_1$. At this instant, the value of the nystagmic signal is stored by the operational amplifier 14. The output of said amplifier is transmitted to the input of the amplifier 16. Said amplifier delivers a signal S which is represented in FIG. 4a. By virtue of a closure of the switches $R_2$ during a short time interval, the value of the mean slope delivered to the terminal 8 of the slope-meter 4 is stored in the amplifier 18 as shown in FIG. 4b. This value is integrated by the amplifier 20 during the fast-return interval, that is to say during the time interval which elapses between $t'_1$ and $t_2$ as shown in FIG. 4c. The outputs of the amplifiers 14 and 20 are added within the amplifier 16, the output of which produces the signal S corresponding to the initial pulse, as shown in FIG. 4d.

At the end of the rapid jerk, the output of the amplifier 16 is stored by the amplifier 28, the output signal of which is represented in FIG. 4e. The output of the amplifier 28 is added to the signal delivered by the terminal 6 to the input 10 of the amplifier 12. Relative displacement of the slow or low-gradient slope of the second signal pulse is thus achieved as shown in FIG. 4f. Finally, the integrating amplifier 20–24 is reset to zero by means of the switch $R_4$. The process begins again for the following pulse.

The output element 16 is provided with an automatic zero-resetting system which is not shown in the drawings and comes into action if the cumulated output S exceeds the full scale of the amplifier.

The circuits for controlling the different switches have not been shown in FIG. 3. These control circuits are of known type and adapted to conditions of use.

For example, the relay $R_1$ can be controlled by a square-wave signal having logical levels 0 or 1, transition from one level to the other being controlled by a device which delivers a pulse each time there is a change of sign of the slope of the nystagmic signal.

The relay $R_2$ which serves to store the value of the slope can be opened during a very short time interval $\tau_1$ by means of a pulse which is delayed with respect to the instant of commencement of a slow phase having a sufficiently short time interval $\tau_2$ so that $\tau_1 + \tau_2 < t$, where $t$ represents the minimum time-duration of a slow phase.

The switch $R_3$ which serves to store the value of the cumulated curve at the end of a slow phase is closed during a very short time interval $\tau_3$ by means of a pulse which is delayed with respect to the instant of ending of a slow phase by a sufficiently short time interval $\tau_4$ so that $\tau_3 + \tau_4 < t'$, where $t'$ represents the minimum duration of a fast-return phase.

The integration time is given to the amplifier 20 by the control signal of the switch $R_1$ by employing the other logical level. The switch $R_4$ is operated in synchronism with $R_1$.

The switches $R_1$, $R_2$, $R_3$ and $R_4$ can be formed by means of MOS transistors, the control signal being applied to the gate inputs of said transistors.

The switch control input can advantageously be constituted by a detector 30 which serves to detect the commencement of each slow slope and of each fast slope and which emits a pulse at one of its two outputs 30a and 30b as the case may be. The outputs 30a (slow slope) and 30b (fast slope) drive a bistable device 32. The output of said bistable device directly controls the switch $R_1$ and the switch $R_4$ by means of a switching circuit 34. The output 30a drives a monostable device 36 having a time constant $\tau_1$ by means of the delay circuit 38 which has a time-delay $\tau_2$. Similarly, the output 30b drives a second monostable device 40 having a time constant $\tau_3$ by means of a delay circuit 42 having a time-delay $\tau_4$.

It would clearly be possible to employ different control circuits and to form the switches $R_1$ by means of electromagnetic relays.

As is readily apparent, the forms of construction of the storage circuits or of the integrator circuit based on operational amplifiers are given solely by way of example and it would not constitute any departure from the scope of the invention to adopt alternative forms.

Moreover, the invention is applicable to all signals other than nystagmographic signals, in which it is advantageous to cumulate useful sections of the signal and of signals obtained by interpolation between the different useful sections.

What is claimed is:

1. A device for cumulating the useful sections of an electrical signal which appears in the form of a series of pulses each having a useful section and a non-useful section, said device producing a cumulated signal $S_n$ comprising means for producing a voltage which is proportional to the mean value of the slope of the useful section of the $n^{th}$ pulse of the signal and for integrating said voltage during the time interval of the non-useful section of the $n^{th}$ pulse producing a signal $I_n$, means for adding the useful section of the $n^{th}$ pulse to the value of a cumulated signal $S_{n-1}$ at the end of the $n - 1$ pulse producing a signal $P_n$ which represents the cumulated signal during this interval of time, and means for superposing the signals $P_n$ and $I_n$, producing the cumulated signal $Sn$ corresponding to the time of the non-useful section of the $n$ pulse.

2. A device according to claim 1, wherein said useful section has a low slope of substantially constant value and said non-useful section has a high slope of opposite sign.

3. A device according to claim 1, wherein said device comprises:

a first summing circuit having two inputs in which the first input is driven by the signal to be cumulated and in which the output is connected by means of a first switch to the input of a first storage circuit, the output of said first storage circuit being intended to drive one of the inputs of a second two-input summing circuit, the output of said second summing circuit being intended to constitute the output of the device;

a second storage circuit whose input is connected by means of a second switch to the output of a system for producing the voltage which is proportional to the slope of the signal, the output of which is connected to the input of an integrating circuit whose output drives the second input of the second summing circuit, said integrating circuit being provided with a switch for zero-resetting of its storage element, a third storage circuit in which the input is connected by means of a third switch to the output of the second summing circuit and in which the output is connected to the second input of the first summing circuit.

* * * * *